US006323948B2

(12) United States Patent
Haque et al.

(10) Patent No.: US 6,323,948 B2
(45) Date of Patent: *Nov. 27, 2001

(54) LIGHT SENSOR FOR WEB-GUIDING APPARATUS

(75) Inventors: Md M. Haque, Edmond; Darcy Winter, Oklahoma City; Dale Hueppelsheuser, Jones; John P. Newton, Edmond; Greg A. Storie, Midwest City, all of OK (US)

(73) Assignee: Fife Corporation, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/756,967

(22) Filed: Jan. 9, 2001

Related U.S. Application Data

(63) Continuation of application No. 09/275,457, filed on Mar. 24, 1999, now Pat. No. 6,175,419.

(51) Int. Cl.[7] .................................................. G01N 21/84
(52) U.S. Cl. ................ 356/429; 250/559.12; 250/559.36
(58) Field of Search ..................... 356/429, 430, 356/431, 384–387, 375; 250/559.36, 559.29; 226/45, 15, 18; 700/66; 702/150; 73/159, 599

(56) References Cited

U.S. PATENT DOCUMENTS

| 3,225,988 | 12/1965 | Drenning . |
| 3,342,284 | 9/1967 | Baird . |
| 3,570,624 | 3/1971 | Denville . |
| 4,110,627 | 8/1978 | Isherwood . |
| 4,291,577 | 9/1981 | Baum et al. . |
| 4,441,367 | 4/1984 | Daws et al. . |
| 4,519,249 | 5/1985 | Hunt . |
| 4,559,451 | 12/1985 | Curl . |
| 4,559,452 | 12/1985 | Igaki et al. . |

(List continued on next page.)

FOREIGN PATENT DOCUMENTS

| 3900928 C1 | 1/1989 | (DE) . |
| 42 09546 A1 | 9/1993 | (DE) . |
| 0 201 576 | 1/1989 | (EP) . |

OTHER PUBLICATIONS

Exhibit "A"—Engineering Drawings of Model SE–4001 Sensor Assembly.
Exhibit "B"—Operating Instructions for SE–4001 Sensor.
Exhibit "C"—Flyer Showing A Photoelectric Centerguide.
Exhibit "D"—Specifications for SE–4001 Sensor.
Exhibit "E"—Model SE–4004 Sensor Assembly.
Exhibit "F"—Drawing of Model SE–4001 Sensor Assembly.
Exhibit "G"—Electrical Interconnection Diagram for Sensor.

*Primary Examiner*—Hoa Q. Pham
(74) *Attorney, Agent, or Firm*—Dunlap, Codding & Rogers, P.C.

(57) ABSTRACT

A sensor system for determining the position of at least one edge of a web of material traveling along a predetermined path. The sensor system has a transmitter assembly capable of selectively transmitting at least one collimated light curtain and a receiver assembly capable of generating output signals in response to receiving portions of the collimated light curtain transmitted by the transmitter assembly. The receiver assembly is spaced a distance from the transmitter assembly so as to define a travel path therebetween whereby at least a portion of the web of material traveling along a predetermined travel path blocks at least a portion of the collimated light curtain transmitted by the transmitter assembly. The output signal generated by the receiver assembly is indicative of the position of the web of material as the same is moved along the travel path between the transmitter assembly and the receiver assembly.

13 Claims, 8 Drawing Sheets

U.S. PATENT DOCUMENTS

| | | |
|---|---|---|
| 4,728,800 | 3/1988 | Surka . |
| 4,730,492 | 3/1988 | Burk . |
| 4,789,431 | 12/1988 | Typpo . |
| 4,833,928 | 5/1989 | Luukkala et al. . |
| 4,901,292 | 2/1990 | Schrauwen . |
| 5,006,719 | 4/1991 | Blaser . |
| 5,021,674 | 6/1991 | Drunner . |
| 5,058,793 | 10/1991 | Neville et al. . |
| 5,072,414 | 12/1991 | Buisker et al. . |
| 5,126,946 | 6/1992 | Ko . |
| 5,220,177 | 6/1993 | Harris . |
| 5,347,135 | 9/1994 | Harris et al. . |
| 5,803,334 * | 9/1998 | Patel et al. ............................ 226/45 |
| 5,932,888 | 8/1999 | Schwitzky . |
| 6,175,419 * | 1/2001 | Haque et al. ........................ 356/429 |

* cited by examiner

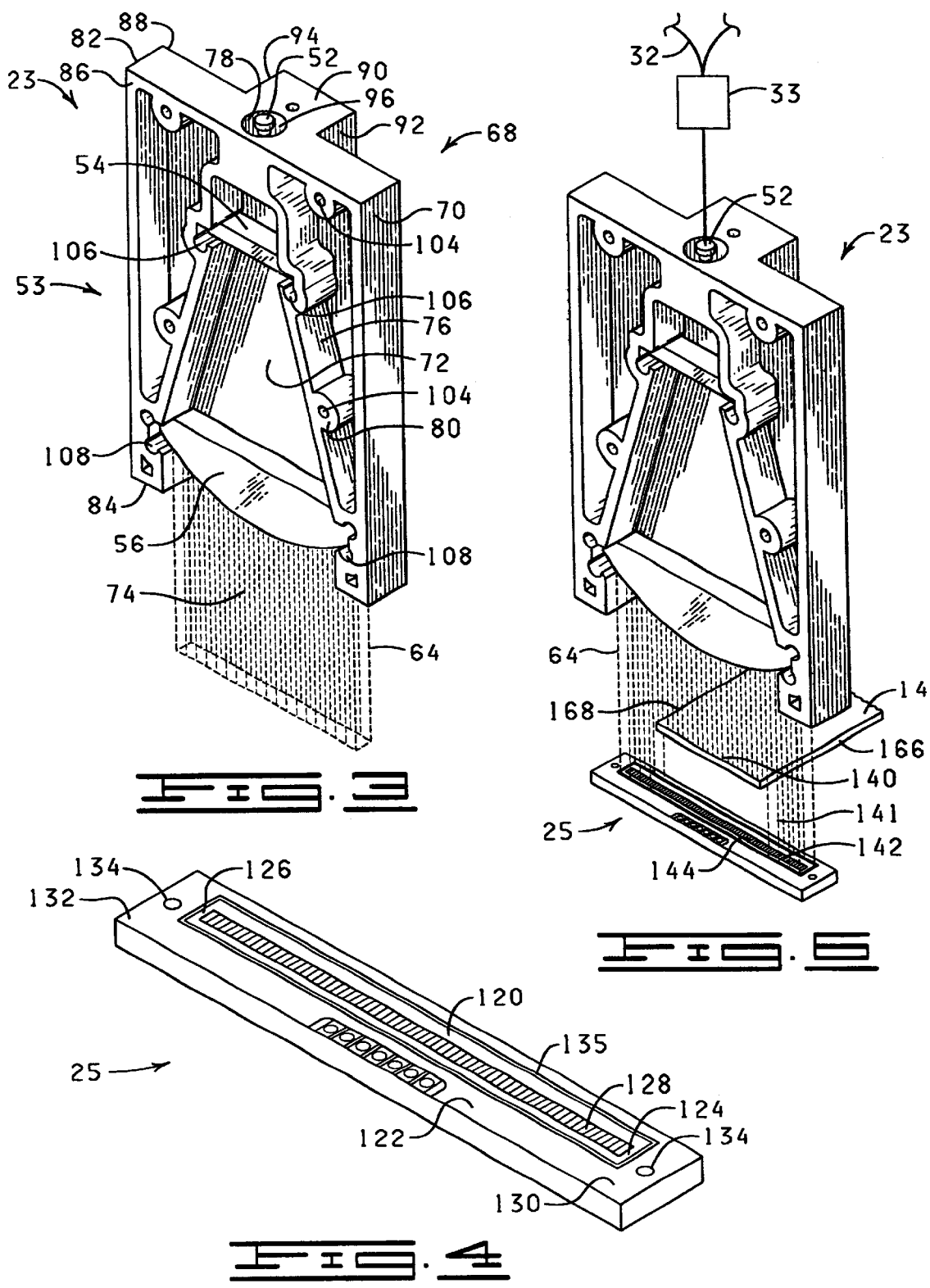

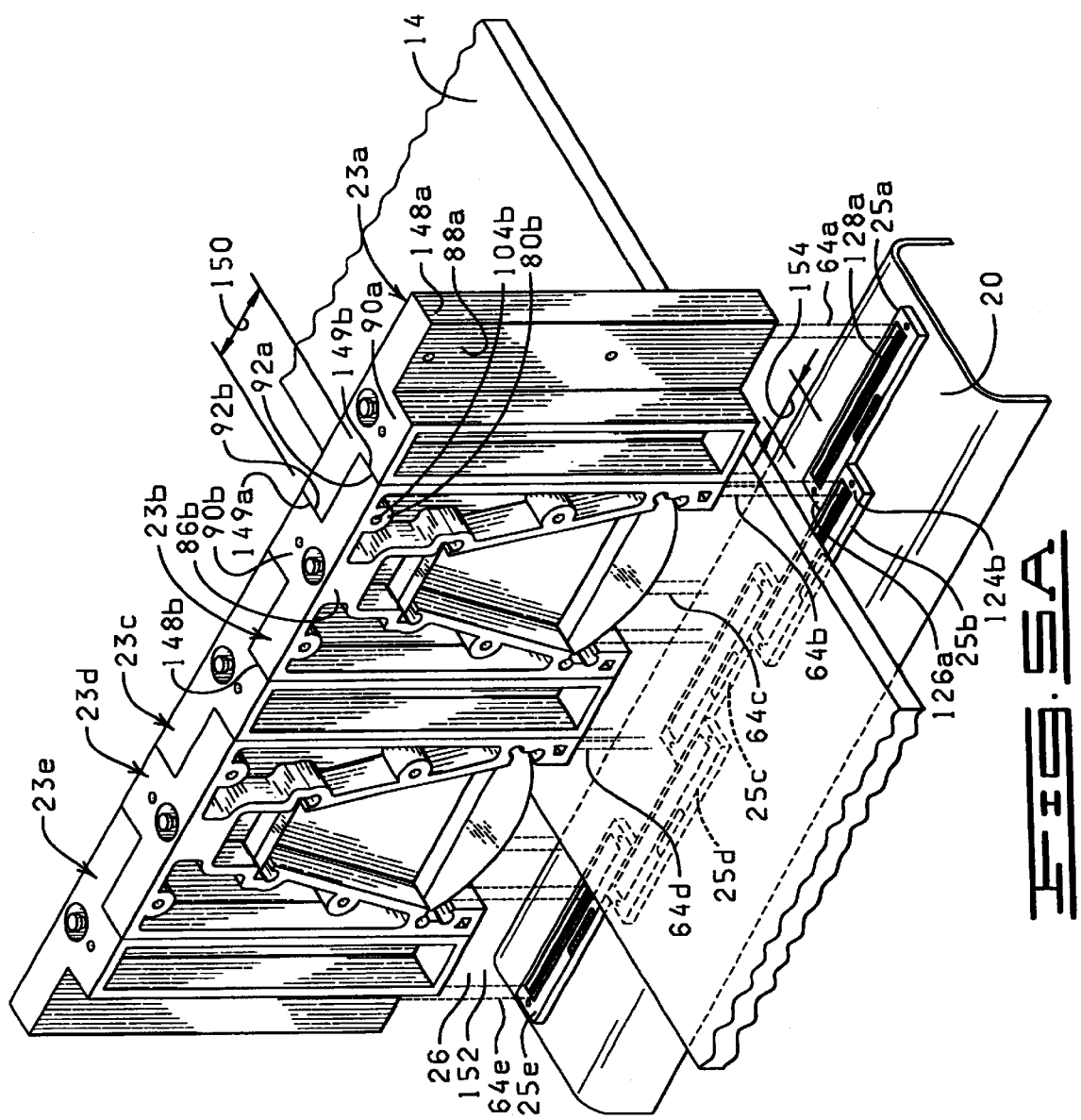

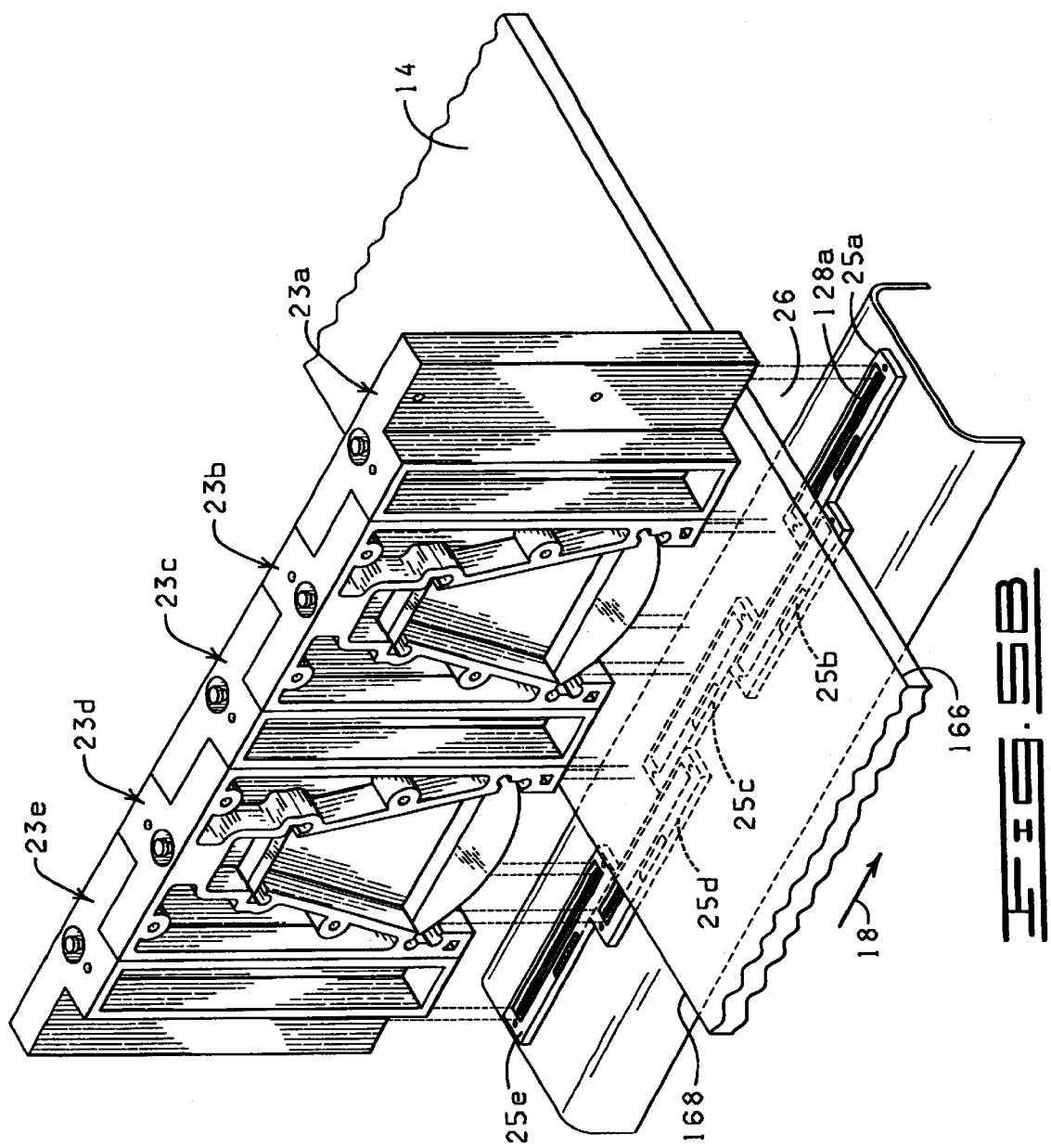

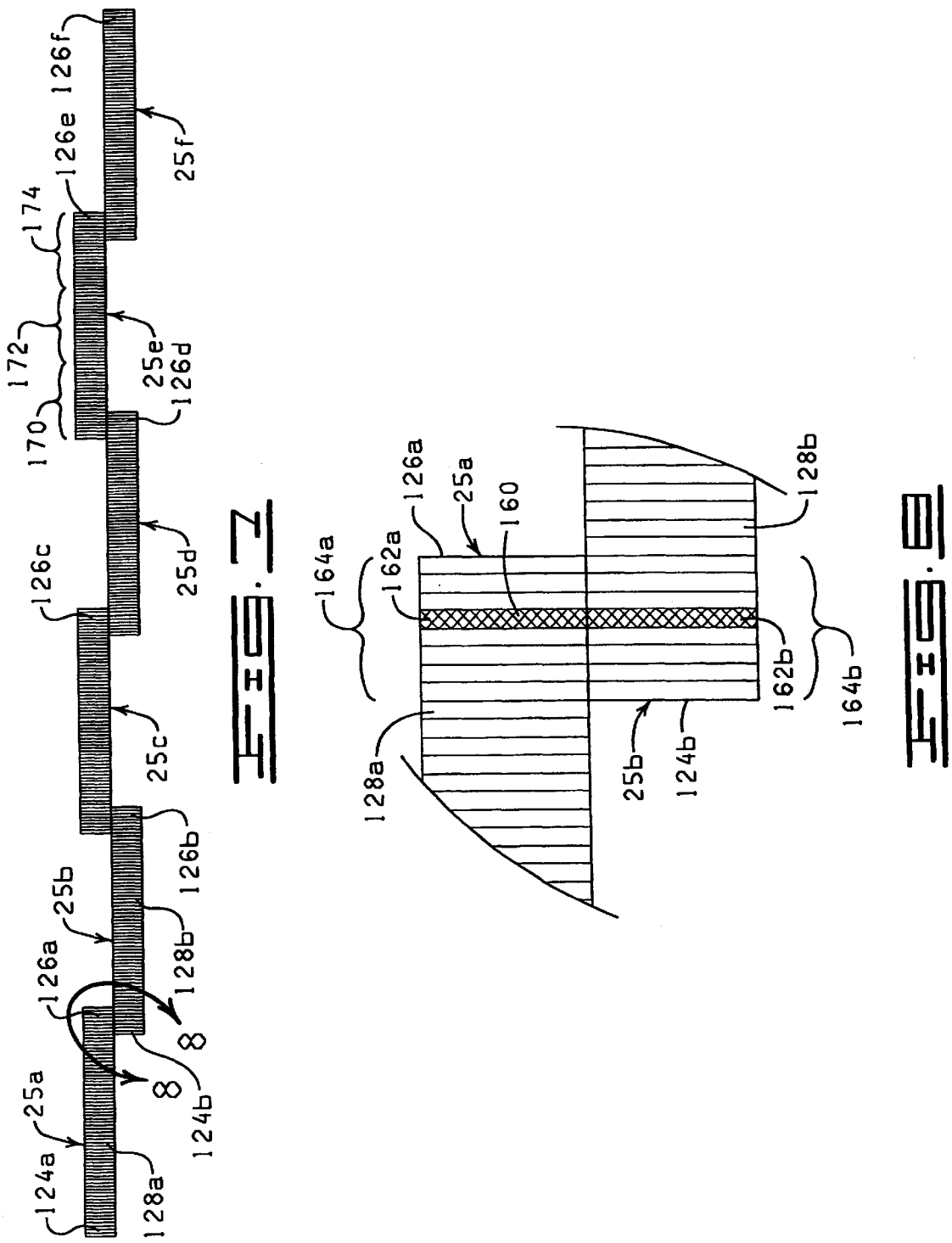

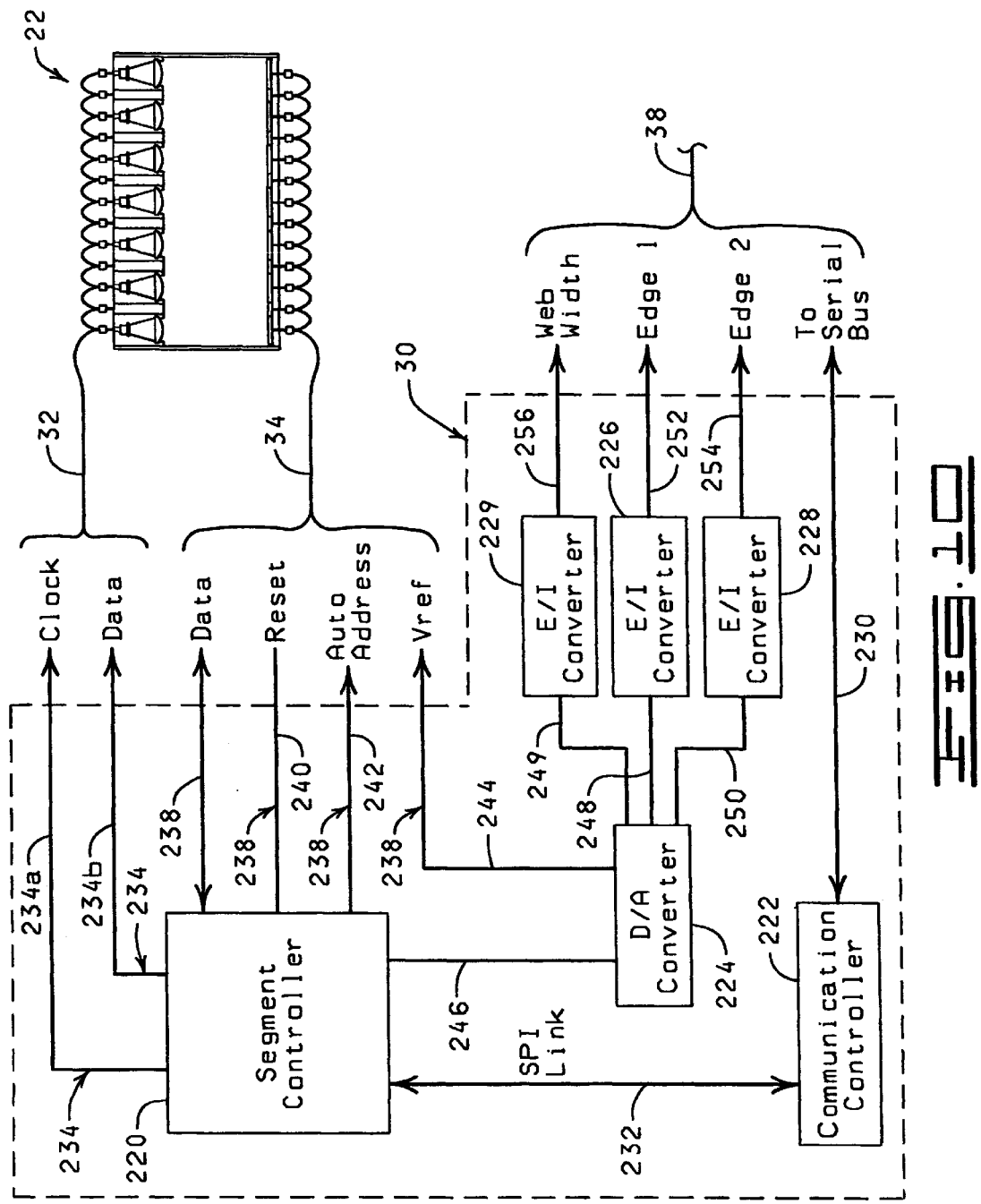

LIGHT SENSOR FOR WEB-GUIDING APPARATUS

CROSS-REFERENCE TO RELATED APPLICATIONS

The present application is a continuation of U.S. Pat. No. 6,175,419 B1, Ser. No. 09/275,457, filed Mar. 24, 1999, entitled LIGHT SENSOR FOR WEB-GUIDING APPARATUS, the entire content of which is expressly incorporated herein by reference.

BACKGROUND OF THE INVENTION

1. Field of the Invention

The present invention relates to a solid-state sensor system for determining the position of at least one edge of a web material.

2. Prior Art

Web edge sensor systems having a transmitter disposed on one side of a web and a receiver disposed on the other side of the web for locating the position of an edge of the web therebetween, are known in the art. To determine information such as the web center, the prior art web edge sensor systems require two sensors. Under this scheme, the two sensors are located at the lateral web edges and are positioned perpendicular to the web direction of travel. The sensors are mounted on mechanical drive systems which adjust the position of the sensors via belts and motors in response to periodic lateral web travel.

The drive system of the prior art web edge sensor systems maintains the position of the sensor relative to the web, which is disposed in between the sensor transmitter and receiver, to accurately determine web location and travel. However, such drive systems are complex and have many moving parts. These drive systems suffer from mechanical error, operate incorrectly, or in some cases completely fail as a result of their complexity. Even minor mechanical error can result in stoppage of the web production line to replace or repair the drive systems. Such interruptions are inefficient and costly.

Thus, a need exists for a sensor system which does not suffer from the aforementioned problems caused by sensors requiring complex mechanical drive systems, as described above, while continuing to accurately determine the web location and movement. It is to such an improved sensor system that the present invention is directed.

SUMMARY OF THE INVENTION

The present invention relates to a light sensor system for determining the position of at least one edge of a web of material traveling along a predetermined path. Generally, the sensor system comprises a transmitter assembly and a receiver assembly.

The transmitter assembly is capable of selectively transmitting at least one collimated light curtain. The receiver assembly is capable of generating output signals in response to receiving at least a portion of the collimated light curtain transmitted by the transmitter assembly. The receiver assembly is spaced a distance from the transmitter assembly so as to define the travel path therebetween. The web of material traveling along the travel path blocks at least a portion of the collimated light curtain transmitted by the transmitter assembly. Thus, the output signal generated by the receiver assembly indicates the position of the web of material as the web of material is moved along the predetermined path in between the transmitter assembly and the receiver assembly.

In one embodiment of the present invention, the transmitter assembly of the present invention includes a plurality of modularly connectable transmit segments to create the collimated light curtain. In this embodiment, the receiver assembly is similarly comprised of a plurality of modularly connectable receive segments. Each receive segment is capable of determining the position of at least a portion of the web of material.

The advantages and features of the present invention will become apparent to those skilled in the art when the following description is read in conjunction with the attached drawings and the appended claims.

BRIEF DESCRIPTION OF THE DRAWINGS

FIG. 2A is a cross-sectional view, in more detail, of an upper lens of the transmit segment taken along the lines 2A—2A depicted in FIG. 2.

FIG. 2B is a cross-sectional view, in more detail, of a lower lens of the transmit segment taken along the lines 2B—2B depicted in FIG. 2.

FIG. 3 is a perspective view of the transmit segment depicted in FIG. 2 retained in a lens holder.

FIG. 4 is a perspective view, in more detail, of one embodiment of a receiver segment of the light sensor system depicted in FIG. 1.

FIG. 5A is a perspective view of a transmitter assembly and receiver assembly of the light sensor system with a web material disposed therebetween.

FIG. 5B is a perspective view of the transmitter assembly and receiver assembly depicted in FIG. 5A with the web material disposed therebetween laterally shifted.

FIG. 6 is a perspective, diagrammatic view of the transmit segment depicted in FIG. 3 and the receiver segment depicted in FIG. 4 having the web material disposed therebetween.

FIG. 7 is a diagrammatic view of the process for calculating a continuous logical sensor from a plurality of staggered and overlapping receive segments.

FIG. 8 is a diagrammatic view, in more detail, of the embodiment of the calculation process depicted in FIG. 7.

FIG. 10 is a schematic view of one embodiment of the main controller of the light sensor system depicted in FIG. 1.

DETAILED DESCRIPTION OF THE PREFERRED EMBODIMENTS

Figure 1:
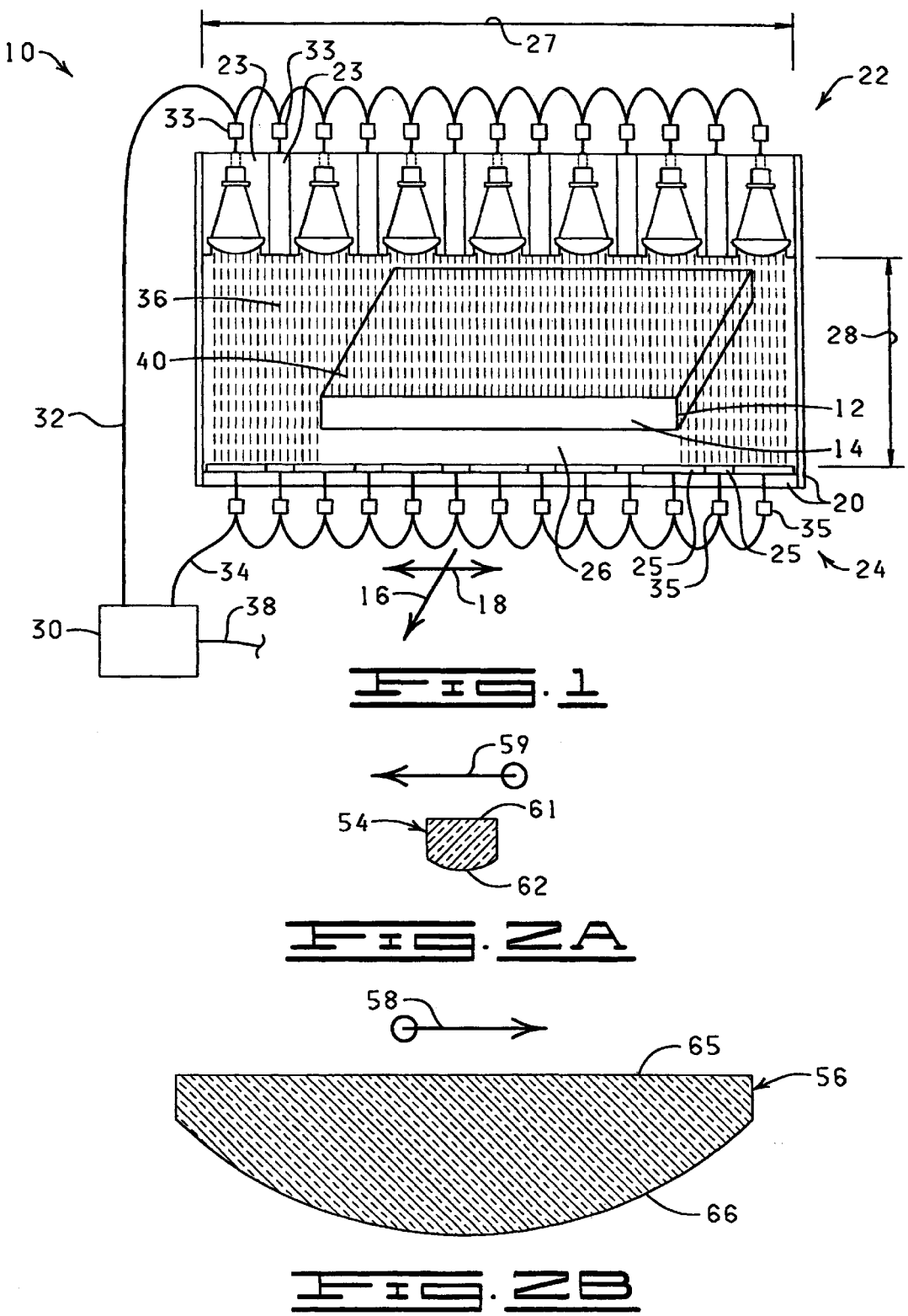
FIG. 1 is a schematic, diagrammatic view of one embodiment of a light sensor system for web-guiding which is constructed in accordance with the present invention.

Referring now to the drawings and in particular to FIG. 1, shown therein is a light sensor system 10 which is constructed in accordance with the present invention. The light sensor system 10 is adapted and constructed to accurately determine the position of at least an edge 12 of a web material 14. The web material 14 may be a continuous web of material and may be moving in a general direction of travel 16 which is generally along a longitudinal axis of the web material 14. The web material 14 may be opaque. As the web material 14 moves along the web direction of travel 16, the web material 14 may deviate in a direction 18, which is generally transverse or lateral to the web direction of travel 16.

The light sensor system 10 includes a system housing 20 constructed of a rigid material, such as sheetmetal. The system housing 20 is adapted to receive a transmitter assembly 22. The transmitter assembly 22 may be formed from a plurality of transmit segments 23. The system housing 20 is also adapted to receive a receiver assembly 24. The receiver assembly 24 may be formed from a plurality of receive segments 25. Only two of the transmit segments 23 and the receive segments 25 are labeled in FIG. 1 for purposes of clarity. The system housing 20 is preferably mounted perpendicularly with respect to the web direction of travel 16. The system housing 20 serves to space the transmitter assembly 22 from the receiver assembly 24 to form a sensor field of view 26 therebetween. The sensor field of view 26 has a length 27 and a sensing gap 28. The length 27 can be greater then the width of the web material 14. The sensing gap 28 extends generally in between the transmitter assembly 22 and the receiver assembly 24. The sensing gap 28 is sufficient to dispose the web material 14 therebetween.

The light sensor system 10 also includes a main controller 30, which communicates with the transmitter assembly 22 via a transmit signal path 32. The transmit signal path 32 is connected to and capable of communicating with a plurality of transmit segment drivers 33. Only two of the transmit segment drivers 33 are labeled in FIG. 1 for purposes of clarity. The main controller 30 also communicates with the receiver assembly 24 via a receiver signal path 34. The receiver signal path 34 is connected to and capable of communicating with a plurality of receiver segment drivers 35. Only two of the receive segment drivers 35 are labeled for purposes of clarity.

Generally, each transmit segment 23 is capable of selectively transmitting a collimated light curtain 36 across the sensor field of view 26. That is, the main controller 30 is capable of transmitting a light transmit signal along the transmit signal path 32 which is received by the transmit segment driver 33. In response thereto, the transmit signal driver 33 transmits a signal to the corresponding transmit segment 23. The transmit segment 23 then generates the collimated light curtain 36. Each receive segment 25 of the receiver assembly 24 is positioned and constructed to receive at least a portion of the collimated light curtain 36 transmitted by the corresponding transmit segment 23, and to generate output signals indicative of the position of the web material 14 disposed in between the transmitter assembly 22 and the receiver assembly 24.

Further, the main controller 30 is capable of receiving output signals on the output signal path 34 from the receive segment drivers 35, which receives such output signals from the corresponding receive segment 25. Each receiver output signal is indicative of the position of at least a portion of the web material 14. Thereafter, the main controller 30 is capable of generating and outputting output signals via an output signal path 38 for communication with other devices, such as a conventional web guiding signal processor (not shown), which may be attached thereto. It will be appreciated that computers or other serial or parallel connected peripheral devices receiving output signals indicative of the position of the web of material 14 may use the output signals for the purpose of controlling the lateral position of the web material 14 by making adjustments in the direction 18 with a motor controlled pivotal platform, for example, to maintain the web of material 14 traveling along a predetermined and desired travel path. The output signals received by such devices on the output signal path 38 may also be used for other purposes such as web width measurement and tension control of the web material 14.

Generally, as the web material 14 passes in between the transmitter assembly 22 and the receiver assembly 24, the web material 14 will interfere with or block the passage of the collimated light curtain 36. The interrupted light beams 40 are unable to pass through the web material 14 and will not be received by the receiver assembly 24. The unblocked portions of the collimated light curtain 36 are received by the receiver assembly 24. As will be understood by those skilled in the art, the portions of the collimated light curtain 36 received by the receiver assembly 24 and the interrupted light beam 40 blocked by the web 14 determine the indicated position of the edge 12. The receiver assembly 24 thereafter transmits via the receiver signal path 34 the information indicative of the location of the interrupted light beam 40. As the web material 14 deviates in the direction 18, various portions of the collimated light curtain 36 transmitted by the transmitter assembly 22 are blocked while other portions of the collimated light curtain 36 become unblocked. Therefore, as the web material 14 moves along the web direction of travel 16, and periodically deviates in the lateral direction 18, the receiver assembly 24 is capable of determining the position of at least one web edge 12 of the web material 14 by the portion of the collimated light curtain 36 received by the receiver assembly 24.

Figures 2, 2C:
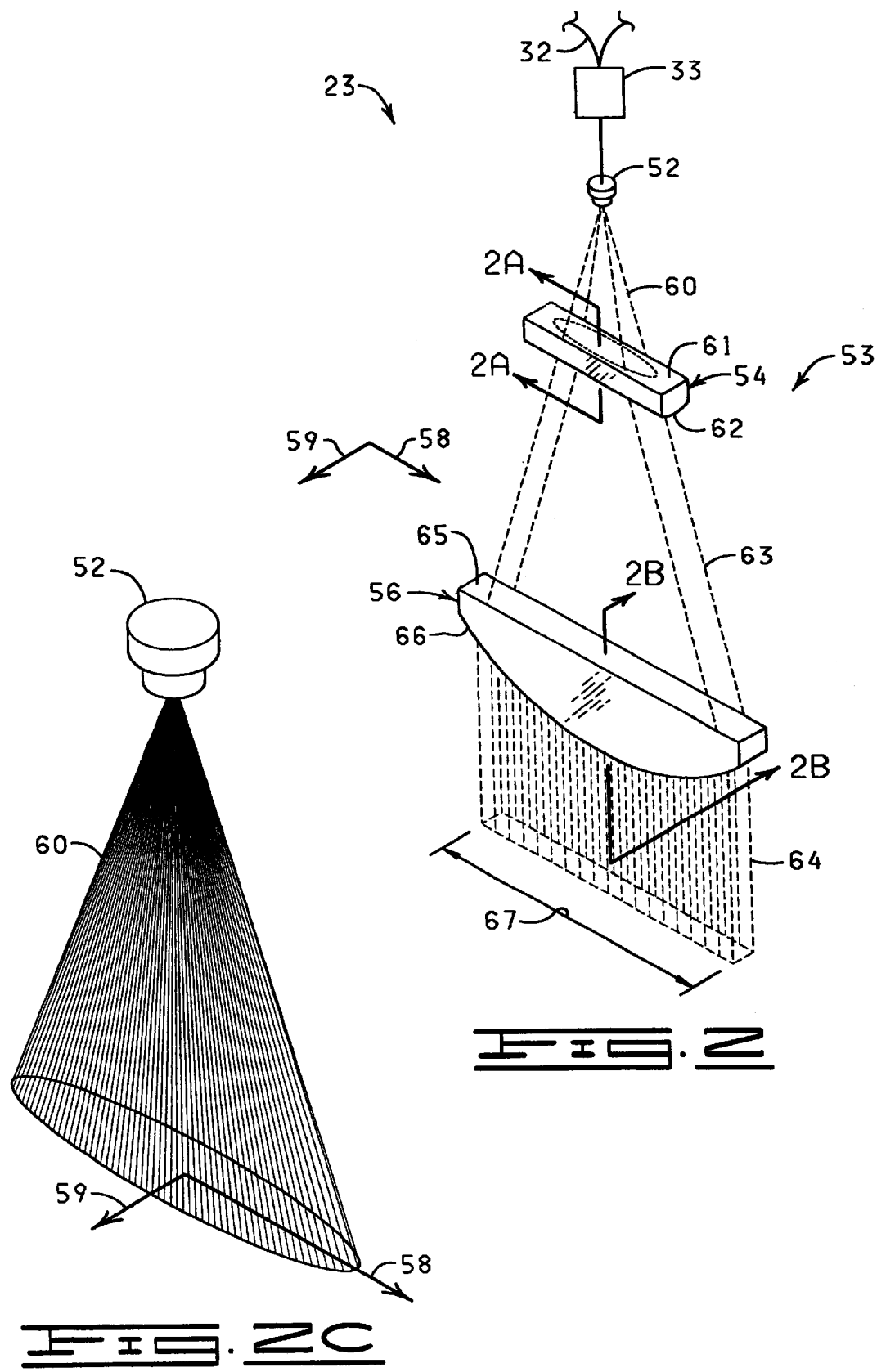
FIG. 2 is a perspective, diagrammatic view, in more detail, of one embodiment of a transmit segment of the light sensor system depicted in FIG. 1.
FIG. 2C is a perspective view of a light source generating an elliptically shaped light beam.

In one embodiment, the transmitter assembly 22 is formed from the plurality of transmit segments 23. Referring now to FIG. 2, the transmit segment 23 is shown in more detail. Because each of the transmit segments 23 is substantially identical in construction and function, only one of the transmit segments 23 will be described in detail. The transmit segment 23 includes a light source 52, and a lens assembly 53. The lens assembly 53 is adapted and constructed to collimate the light generated by the light source 52. In one embodiment, the lens assembly 53 includes an upper optical lens 54, and a lower optical lens 56. The light source 52 is capable of producing light beams 60 of elliptical shape. As shown in FIG. 2C, light beams 60 are wider in the major axis 58 direction (horizontal) and smaller in the minor axis 59 direction (vertical). That is, the elliptically shaped light beams 60 emitted by the light source 52 diverges both along the major axis 58 and the minor axis 59. The transmit segment driver 33 consists of an on-off switch so as to be independently controllable by the main controller 30. The transmit segment driver 33 can be actuated and deactuated by interpreting the light transmit signal received on the transmit signal path 32 for light beam transmission. The transmit segment driver 33 is capable of light intensity control adjustment. Based on the interpretation of the received light transmit signal, the transmit segment driver 33 communicates with the light source 52 such that the light beam emitted may be turned on and off accordingly. Therefore, the light source 52 can be selectively actuated and deactuated and can be controlled independently of the light sources 52 of other transmit segments 23 via the signal path 32.

The light source 52 can be any light source capable of generating a light beam (visible or non-visible) that can be collimated. For example, the light source 52 can be a semiconductor laser diode, a light emitting diode, a light emitting diode cluster, an incandescent lamp, or a gas laser. In one embodiment, the light source 52 may be a visible or infrared laser diode (Class IIIA type) having a wavelength ranging from about 635 nM to about 800 nM and a power output ranging from about 1 mW to about 5 mW, obtainable from Samsung of Korea.

The upper optical lens 54 has a substantially planar entry side 61 and a convex exit side 62. The upper optical lens 54 is spatially disposed from the light source 52 and positioned to receive a substantial portion of the light beams 60 emitted by the light source 52. The upper optical lens 54 is shaped to collimize one axis of the elliptically-shaped light beams 60. Thus, the light beams 60 received through the entry side 61 of the upper optical lens 54 pass through the upper lens 54 and are optically modified by the upper optical lens 54 so as to produce light beams 63 which are collimated on the minor axis 59, and non-collimated on the major axis 58.

Referring to FIG. 2A, it can be seen that the exit side 62 of the upper optical lens 54 is curved outwardly (convex) in relation to the entry side 61 so as to collimize the light beams 60 along the minor axis 59. That is, the light beams 63 exiting the upper optical lens 54 continue to elliptically diverge along the major axis 58, but are collimized along the minor axis 59.

Referring back to FIG. 2, the lower optical lens 56 is spaced a distance from the upper optical lens 54. The lower optical lens 56 has a substantially planar entry side 65 and a substantially curved or convex exit side 66. The exit side 66 has a substantially curved length in relation to the entry side 65. The entry side 65 of the lower optical lens 56 is capable of receiving the light beams 63, which are collimated on the minor axis 59 and non-collimated on the major axis 58, projected from the upper optical lens 54. The lower optical lens 56 is shaped to collimize the remaining non-collimated major axis 58 of the light beams 63 and thereby produce a collimated light curtain 64 formed of light beams which are collimated on both axes of the major and minor axes 58 and 59.

It can be seen that the exit side 66 is substantially curved and in a non-parallel relationship with the entry side 65. Referring to FIG. 2B, it can be seen that the entry side 65 of the lower optical lens 56 is substantially non-parallel to the exit side 66. This curved non-parallel disposition contributes to produce the collimated light curtain 64 which is collimated on both the major axis 58 and the minor axis 59. Thus, the resulting collimated light curtain 64 has a width 67 extending across the exit side 66 of the lower optical lens 56 and is projected as a substantially continuous, rectangular shaped collimated light curtain 64. Therefore, the transmit segment 23, upon receiving a light transmit signal on the transmit signal path 32, produces the collimated light curtain 64 of varying intensity with negligible divergence.

Now referring to FIG. 3, the transmit segment 23 includes a holder 68 for supporting the light source 52 and the lens assembly 53. The holder 68 is constructed of a rigid material, such as sheetmetal, steel, molded plastic, polymeric material or polymeric composite material of low thermal coefficient of expansion, graphite, fiberglass, aluminum, and combinations thereof. The holder 68 includes a housing 70 having an internal cavity 72 disposed therein and an opening 74 for permitting the collimated light curtain 64 generated therein to exit the housing 70. The holder 68 includes a first support member 76, a second support member 78, and a connector assembly 80. The first support member 76 is disposed within or adjacent to the internal cavity 72 for retaining the upper optical lens 54 and lower optical lens 56 of the lens assembly 53 in a spatially disposed relationship. The second support member 78 is disposed within the internal cavity 72 of the housing 70 and communicates therewith for retaining the light source 52 such that the light source 52 is in optical alignment with the upper and lower optic lenses 54 and 56. Such disposition of the light source 52 allows light beams 60 generated by the light source 52 to pass sequentially through the upper and lower optic lenses 54 and 56 retained therein before exiting the housing 70 via the opening 74.

The connector assembly 80 of the holder 68 is provided on the housing 70 for connecting the housing 70 of the holder 68 to the housing 70 of an adjacently disposed holder 68 in such a manner that the collimated light curtains 64 emitted by the adjacently disposed transmit segments 23 overlap in a spaced-apart and staggered formation as best shown in FIGS. 7 and 8.

In one embodiment, the housing 70 of the holder 68 has an upper end 82, a lower end 84, a front side 86, and a rear side 88. A mating rib 90 is located on the rear side 88 of the housing 70. The mating rib 90 extends outwardly from the rear side 88 and is disposed the length of the holder 68 from the upper end 82 to the lower end 84. The mating rib 90 has a first side 92 and a second side 94 which are adapted to matingly engage with adjacently disposed holders 68 when such adjacently disposed holders 68 are reversely disposed relative to the holder 68 in a staggered formation, as will be explained in more detail hereinafter with reference to FIGS. 5A and 5B.

An aperture 96, located on the upper end 82, is fitted to receive the light source 52. The aperture 96 communicates with the internal cavity 72 of the holder 68 so that the light beam 60 generated by the light source 52, which is disposed within the aperture 96, projects unimpeded into the internal cavity 72.

The connector assembly 80 can be provided with a plurality of spatially disposed apertures 104. Each aperture 104 of the connector assembly 80 communicates from the front side 86 to the rear side 88 of the housing 70 of the holder 68. The aperture 104 is sized to allow a connecting means, such as a threaded screw or other attaching devices, to be disposed therethrough to secure the housing 70 of the holder 68 to the reversely disposed housing 70 of an adjacently disposed holder 68.

The first support member 76 is provided with aligned upper slots 106 near the upper end 82 of the housing 70. The upper slots 106 are fitted to receive and retain the upper optical lens 54. Similarly, the first support member 76 is also provided with aligned lower slots 108 near the lower end 84 of the housing 70. The lower slots 108 are fitted to receive and retain the lower optical lens 56, such that the upper optical lens 54 is securely retained and disposed a distance from the lower optical lens 56.

Therefore, when the light source 52 transmits light beams 60 through the aperture 96, wherein the light source 52 is disposed, the light beams 60 project into the internal cavity 72, and pass through the upper optical lens 54, and through the lower optical lens 56 with the previously described result of producing the collimated light curtain 64. Further, the opening 74 provided in the lower end 84 of the holder 68 allows the resulting collimated light curtain 64 to be projected out of the housing 70 of the holder 68 without any obstruction thereto. Therefore, one skilled in the art will appreciate that the holder 68 provides a secure and efficient means for retaining the light source 52, and lens assembly 53 of the transmit segment 23, as well as providing mating capabilities in combination with similarly constructed transmit segments 23.

Referring now to FIG. 5A, a plurality of transmit segments 23 is shown disposed above a plurality of receiver segments 25. For purposes of clarity similar elements of the transmit segments 23 have been provided with an alphabetic suffix, i.e. a, b, c, d and e. Also for purposes of clarity, only the first transmit segment 23a and the second transmit segment 23b will be described herein.

It can be seen that the first transmit segment 23a is disposed adjacent and in a generally inverted or reverse relationship relative to the disposition of the second transmit segment 23b. The transmit segments 23 are shown having a first side 148, and a second side 149. The mating rib 90a of the first transmit segment 23a is shown to matingly engage the second side 149b of the second transmit segment 23b. Because a distance 150 from the first side 92a of the mating rib 90a to the second edge 149a of the transmit segment 23a represents the same distance 150 from the first side 92b of the mating rib 90b to the second edge 149b of the second transmit segment 23b, the first transmit segment 23a formingly mates with the adjacent and reversely disposed transmit segment 23b.

Once the transmit segment 23a and the transmit segment 23b have been mated, they are secured in their mated position by a securing means, such as a threaded screw, bolt or other such known securing device, through the aperture 104b of the connecting assembly 80b located on the front side 86b of the second transmit segment 23b until such securing means similarly attaches to the aperture 104a located on the rear side 88a of the first transmit segment 23a.

Such mating and securing construction enables the transmit segment 23a to be mated and securely fixed to the transmit segment 23b to prevent independent movement of either transmit segment 23a or 23b in relation to the other transmit segment 23a or 23b. The mating scheme described is duplicated for mating the transmit segment 23b with the transmit segment 23c, shown adjacent and reversely disposed relative to the second transmit segment 23b. It can be seen that such a mating scheme permits any number of transmit segments 23 to be interconnected and thereby provide the field of view 26 with any suitable length 27 appropriate for sensing on or both edges 12 of the web material 14.

The staggered mating scheme of the transmit segments 23 also produces collimated light curtains 64 that are spaced a distance apart and overlap in a staggered formation. Thus, the staggered orientation of each collimated light beam 64 produces a continuous collimated light curtain 152 that extends throughout the light sensor system 10 field of view 26. However, this staggered arrangement also has the effect of creating an overlap distance 154 whereby the collimated light curtain 64a of the first transmit segment 23a extends past the edge of the collimated light beam 64b produced by the second transmit segment 23b. The consequences of the overlap distance 154 created thereby will be discussed in greater detail hereafter.

In one embodiment, the receiver assembly 24 is formed from the plurality of receive segments 25. Each receive segment 25 receives the collimated light curtain 64 generated by one of the transmit segments 23 of the transmitter assembly 22. Referring now to FIG. 4, the receive segment 25 is shown in more detail. Because each receive segment 25 is substantially identical in construction and function, only one of the receive segments 25 will be described in detail. The receive segment 25 includes a linear sensor array 120 mounted onto an array base 122. The linear sensor array 120 has a first end 124, a second end 126 and a plurality of photodiodes 128. The photodiodes 128 are well known in the art of light-sensitive and photoactivated devices capable of generating signals in response to photoactivation. Since these devices are well known in the art, no further discussion is deemed necessary to teach one of ordinary skill in the art how to make or use the present invention.

The photodiodes 128 extend from the first end 124 to the second end 126 of the linear sensor array 120. The array base 122 has a first end 130 and a second end 132. Apertures 134 are located near the first end 130 and the second end 132 of the array base 122. The apertures 134 are provided so that the receive segment 25 can be secured to the system housing 20 (FIG. 1) by projecting a connecting member, such as a threaded screw, through the apertures 134 for attachment to the system housing 20.

Each receive segment 25 is provided as a means for detecting light signals received from a corresponding one of the transmit segments 23. As the photodiodes 128 react to the collimated light curtain 64 produced by the transmit segments 23, each photodiode 128 produces a signal in response to receipt of light as such are photoactivated and thus indicate reception of such portion of the collimated light curtain 64. These signals are transmitted onto the receiver signal path 34. Other types of light sensing arrays of linear or non-linear construction may be employed for the present purposes. However, the linear sensor array 120 is shown for the purposes of describing an example of a linear sensor array capable of performing the light sensing requirements of the present invention. For ambient light immunity, a filter 135, is placed in between the transmitter assembly 22 and the plurality of photodiodes 128. The filter 135 is capable of passing the collimated light curtain 36 while preventing the passage of other light therethrough so as to provide the ambient light immunity for the photodiodes 128. For example, in one embodiment the filter 135 is a red light filter including an integral horizontal light control film.

Referring now to FIG. 5A, only a first receive segment 25a and a second receive segment 25b will be described hereinafter for purposes of clarity. Each receive segment 25 is fixed to the system housing 20 as previously described. The receive segments 25 are disposed on the system housing 25 in staggered horizontal formation. The first receive segment 25a is therefore disposed on the system housing 20 such that the second end 126a of the first receive segment 25a extends beyond the first end 124b of the second receive segment 25b. That is, the second end 126a of the first receive segment 25a is adjacently disposed beside and beyond the first end 124b of the second receive segment 25b in a staggered formation.

The first receive segment 25a is disposed such that the collimated light curtain 64a projected by the first transmit segment 23a will be projected substantially onto the photodiodes 128a of the first receive segment 25a. The staggered orientation of the plurality of the transmit segment 23 is substantially duplicated by the plurality of receive segments 25, which are disposed such that the continuous collimated light curtain 152 produced by the plurality of transmit segments 23 is projected onto the photodiodes 128 of the respective receive segments 25.

Referring to FIGS. 5A and 5B, the web material 14 is disposed in between the transmitter assembly 22 and the receiver assembly 24 in the light sensor system 10 field of view 26. The web material 14 is disposed such that the web material 14 interferes with portions of the continuous collimated light curtain 152. Specifically, the web material 14 blocks passage of portions of the collimated light curtain 64b generated by the first transmit segment 23b. Similarly, the web material 14 blocks passage of portions of the collimated light curtain 64e generated by the last transmit segment 25e. The web material 14 is shown to completely impede passage of the collimated light curtains 64c and 64d generated by respective transmit segments 23c and 23d.

As the web material 14 moves in the lateral direction 18 across the field of view 26 (FIG. 5B), a first edge 166 of the web material 14 becomes disposed in between the first transmit segment 23a and the first receive segment 25a. Therefore, the collimated light curtain 64a generated by the first transmit segment is partially blocked by the first edge 166 of the web material 14. Thus, portions of the photodiodes 128a of the receive segment 25a receive portions of the collimated light curtain 64 and are thereby photoactivated, while other portions of the photodiodes 128a of the receive segment 25a are blocked by the web material 14 from receiving portions of the collimated light curtain 64 and are non-photoactivated. Photodiodes 128 of the receive segments 25b and 25c are non-photoactivated since the web material 14 completely blocks the collimated light curtain 64b and 64c generated by the transmit segments 23b and 23c. Portions of the photodiodes 128d of the receive segment 25d receive portions of the collimated light curtain 64d and are thereby photoactivated, while other portions of the photodiodes 128d of the receive segment 25d are blocked by the web material 14 from receiving portions of the collimated light curtain 64d and are non-photoactivated. The photodiodes 128e of the receive segment 25e are photoactivated because the collimated light 64e is not impeded by the web material 14.

Thus it can be seen that the signals transmitted by the receiver assembly 24 based upon the photoactivated responses of the photodiodes 128 of the receive segments 25 are indicative of the position of the first edge 166 and the second edge 168 of the web material 14, as well as, other information which can be determined therefrom, such as the center position of the web material 14. Additionally, it can be seen that the receive segment 23a (FIG. 5B) produces output signals indicative of the position of the first edge 166 of the web material 14, while the receive segment 25d produces output signals indicative of the second edge 168 of the web material 14. However, the receive segments 25b, 25c, and 25e produce signals that are not indicative of the position of the first edge 166 or the second edge 168 of the web material 14.

Therefore, the signals generated by the receive segments 25 where the corresponding collimated light curtain 64 is either completely received or completely obscured is less relevant. For efficiency, these output signals produced by the receive segment 25 may be ignored or the corresponding transmit segment 23 may be powered off until such time as the web material 14 moves and the corresponding transmit segment 23 is powered back on.

Referring now to FIG. 6, one of the transmit segments 23 of the transmitter assembly 22 is shown projecting the collimated light curtain 64 onto a corresponding receive segment 25 of the receiver assembly 24 disposed therebelow. In operation, a light transmit signal, such as a binary bit pattern, is received along the transmit signal path 32 by the transmit segment driver 33 to selectively turn the transmit segment 23 on and off. Once the light source 52 is actuated, the light beams 60 emitted by the light source 52 pass through the upper optical lens 54 and the lower optical lens 56 of the lens assembly 53 thereby producing the collimated light curtain 64.

The web material 14 projected in between one of the transmit segments 23 of the transmitter assembly 22 and one of the receive segments 25 of the receiver assembly 24 interferes and obstructs portions 140 of the collimated light curtain 64. The unobstructed portions 141 of the collimated light curtain 64 are received by the receiver assembly 24. Certain lighted photodiodes 142 of the receive segment 25 will produce a photoactivated response and react to the unobstructed portions 141 of the collimated light curtain 64, while other unlighted photodiodes 144 will not produce a photoactivated response. By monitoring the linear sensor array 120, the receive segment 25 determines which ones of the photodiodes 128 are photoactivated or not photoactivated. This information is conveyed to the main controller 30 and the main controller 30 determines the location of the web edges 166 and 168 of the web material 14. Once the location of the web edges 166 and 168 has been determined, the main controller 30 can then determine the location of the web center or other information in a well known manner.

Edge detection of the web material 14 may be accomplished by comparing the signal transition of the activated and non-activated photodiodes with respect to a set threshold. In this scheme, the analog value of the sensor signal is unimportant. Therefore, the environmental effect on the receiver assembly 24 output, such as the effect of temperature variation, is minimal.

Additionally, the light sensor system 10 may be used with any signal processor that can accept analog input. Such other applications are a moving-sensor center-guide mode. In such mode, the light sensor system 10 may accept web width variations within the sensor field of view 26 without any concerns for mechanical sensor repositioning. Similarly, other such applications for the light sensor system 10 are fixed-sensor guiding-mode. The fixed sensor guiding mode is intended for guiding with either edge 166 or 168 of the web material 14. The web material 14 can be placed anywhere within the sensor field of view 26. Because the light curtain 64 is collimated, the beam divergence is minimal. Thus, the intensity of the light curtain 64 remains substantially the same for variable sensing gaps. The collimated light curtain 64 also provides plane change immunity throughout the field of view 26 at any web plane in the sensing gap 28 so non-lateral movement will not generate a false interpretation of the lateral position of the web material 14.

Therefore, the output signals transmitted onto the receiver signal path 34 are indicative of the position of the web material 14. The signals communicated along the receiver signal path 34 are transmitted to the main controller 30 and thereafter onto the output signal path 38 for the purposes described above. The light sensor system 10 can also be connected to a serial bus for a wider range of applications to support features such as programmable proportional band for either edge, relocatable proportional bands, web width monitoring and output for other process control besides guiding (such as tension control), web centerline calculations, machine center calculations and calibrations, web centerline shift with respect to calibrated machine center anywhere within the light sensor system 10 field of view 26, display amount of relative web centerline shift with respect to a machine center, near instantaneous web seeking, programmable web centerline shift speed, user interface for basic web guiding and positioning.

Referring now to FIG. 7, a diagrammatic view of a plurality of receive segments 25 is shown adjacently disposed in staggered formation. The staggered formation of the plurality of receive segments 25 creates an overlap. The overlap is an area of redundant photodiodes 128 of adjacently disposed receive segments 25. For illustrative purposes, the first receive segment 25a and second receive segment 25b are shown and will be described hereinafter.

It can be seen that the photodiodes 128a located near the second end 126a of the first receive segment 25a overlap and are redundant, for light detecting purposes along a horizontal plane, to the photodiodes 128b located near the first end 124b of the second receive segment 25b. However, the staggered disposition of the plurality of receive segments 25 is necessary for receiving the continuous collimated light curtain 152. For purposes of detecting light, consideration must be made for this overlap to prevent redundant information regarding portions of the collimated light curtain 64 received to be communicated from both the first receive segment 25a and the second receive segment 25b for improved accuracy and efficiency.

Referring now to FIG. 8, an enlarged view of the overlap area is shown. The second end 126a of the first receive segment 25a is substantially adjacent to and extends past the first end 124b of the second receive segment 25b. That is, the first and second receive segments 25a and 25b are overlapped so that a gap does not form in between the first end 124b of the second receive segment 25b and the second end 126a of the first receive segment 25a along the horizontal plane. As a result of the overlapping of the first and second receive segments 25a and 25b, it is necessary to compute the total number of photodiodes 164a of the first receive segment 25a that overlap along the horizontal plane and are redundant to the photodiodes 164b of the second receive segment 25b.

Because the total number of photodiodes 128 contained within the receive segment 25 is known, one can determine the photodiodes 164b of the receive segments 25b which are redundant of the photodiodes 164a of the receive segment 25a with respect to the light sensing information obtained therefrom. Thus, photoactivated signal from all the overlapped portions of the photodiodes 128b of the receive segment 25b are unnecessary to obtain accurate and non-redundant signals from the receive segments 25a and 25b.

Thus, it can be seen that when the total number of pixels in each receive segment 25 equals 510, and an overlap of 10 pixels exists in the region 164b (FIG. 8), the eleventh pixel of the receive segment 25b from the first end 124b becomes the 513th pixel in the logical sensor ay and the first ten pixels of the receive segment 25b are ignored.

Therefore, by sampling the all the photodiodes 128a of the receive segment 25a and all the photodiodes 128b of the second receive segment 25b, ignoring signals received from the photodiodes 164b of the second receive segment 25b, eliminates redundant photoactivated signals. The process of ignoring certain photodiodes 128, such as the photodiodes 164b of the receive segment 25b, which are redundant to adjacently disposed photodiodes 128, such as the overlapped photodiodes 164b of the receive segment 25b produces a logical sample of the photodiodes 128 of the staggered receive segments 25. Such logical samples yield accurate information about light received by the receive segment 25a and the second receive segment 25b along a horizontal plane without the error or redundancy otherwise created by computing or sampling the overlapping photodiodes 164b of the receive segment 25b.

This method of compensating for the overlap created by the staggered transmit segments 23 and receive segments 25 has the benefit of creating a continuous area of light reception along the horizontal plane for light detection purposes while not being subject to deficiencies associated with or errors created by the redundant photo-detecting capabilities in the overlap area. Therefore, a continuous logical receiver is created which is capable of detecting light transmissions along the horizontal plane.

One example of calculating the overlap and computing a continuous logical receiver is to assume that each of the receive segments 25 shown (FIG. 7) contain 510 total pixels (tPX). Also assume that 10 pixels overlap at each point of overlap, for example, that the number of pixels on the second end 126a of the receive segment 25a that overlap with pixels on the first end 124b of the second receive segment 25b equals 10 pixels. The first receive segment 25a overlap position RS[0] is equal to 10 overlapping pixels. Since the overlap condition occurs at the second end 126 of each of the receive segments 25a, 25b, 25c, 25d, 25e, but not the second end 126f of the receive segment 25f, a total number of 5 overlap conditions with a total number of overlapping pixel (tOP) is expressed as: (tOP=RS[0]+RS[1]+RS[3] +RS[4]+RS[5]). The total number of receive segments 25 can be stated as the variable (tRS) The total logical pixels can be computed with the following formula: ([(tRS−1)×tPX]−tOP). It will be understood that there is no limit to the number of transmit segments 23 comprising the transmit assembly 22 or the number of receive segments 25 comprising the receiver assembly 24 and thus no limitation on the length 27 of the sensor field of view 26.

Referring now to FIG. 7, shown therein is the receiver assembly 24 which is formed of the plurality of receiver segments 25 as previously discussed. The various receiver segments 25 forming the receiver assembly 24 are controlled by the receive segment drivers 35 so as to selectively actuate and deactuate the receiver assemblies 25 based upon signals received from the main controller 30. The receive segment drivers 35, such as a dedicated micro-controller, is capable of initiating scanning of the linear sensor array 120 or performing scanning based upon signals received from the main controller 30. The selective actuation and deactuation of the receive segments 25 permits the main controller 30 to selectively actuate and deactuate the transmit segments 23 so that the actuated transmitter assembly 22 and receiver assembly 24 tends to follow the edge 12 of the web material 14 so that energy is conserved and the effective lives of the light sources 52 are extended. The actuated transmit segments 23 may be referred to herein as relocatable, proportional bands or logical sensors.

As previously stated, each of the receive segments 25a–f are identical in construction and function. Thus, as shown in FIG. 7, only the receive segment 25e has been shown. However, each of the remaining receive segments 25 forming the receiver assembly 24 are likewise provided with a left-hand section 170, a medial section 172, and a right-hand section 174. Each of the left-hand section 170, the medial section 172, and the right-hand section 174 includes approximately one-third of the photosensitive pixel-width of the receive segment 25e.

When the transition between the actuated and deactuated photodiodes 128 falls within the left-hand section 170 of the receive segment 25e, the main controller 30 is programmed to actuate the transmit segment 23 located adjacent the left-hand section 170, which in this case, would be the transmit segment 23 corresponding to the adjacent receive segment 25d. When the transition between the actuated and deactuated photodiodes 128 falls within the medial section 172 of the receive segment 25e, the main controller 30 is programmed to only actuate the transmit segment 23 which, in this case, would be the transmit segment 23 corresponding to the receive segment 23e disposed adjacent the edge 12 of the web of material 14.

When the transition between the actuated and deactuated photodiodes 128 indicates that the edge 12 of the web material 14 is located adjacent the right-hand section 174, the main controller 30 is programmed to automatically actuate the transmit segment 23 located adjacent the right-hand section 174, which in this case is the adjacent receive segment 25*f*.

When the transition between the actuated and deactuated photodiodes 128 moves from the left-hand section 170 to the medial section 172, the main controller 30 is programmed to automatically deactuate the transmit segment 23 located adjacent the left-hand section 170 (which is the adjacent receive segment 25*d*) and the transmit segment 23 located adjacent the right-hand section 174 (which in this case is the adjacent receive segment 25*f*). Similarly, when the transition between the actuated and deactuated photodiodes 128 moves from the right-hand section 174 to the medial section 172, the main controller 30 is programmed to automatically deactuate the transmit segment 23 located adjacent the left-hand section 170 (which is the adjacent receive segment 25*d*) and the transmit segment 23 located adjacent the right-hand section 174 (which in this case is the adjacent receive segment 25*f*).

By selectively actuating and deactuating the transmit segments 23 which correspond to the receive segments 25 which are disposed adjacent the respective left-hand section 170, and right-hand section 174, as discussed above, the actuated transmit segments 23 generally follow the edge 12 of the web material 14.

The logical web edge sensors of the present invention are especially useful in that it requires no mechanical movement because the sensor is a logical interpretation of the continuous collimated light curtain 152 produced by the plurality of transmit segments 23 and receive segments 25.

Further, such logical sensors increase the accuracy and efficiency of the invention by requiring only that portions of the continuous collimated light curtain 152 be illuminated (see FIG. 6), by controlling the respective transmit segments 23, and similarly, only the respective receive segments 25 remain active for this process. Thus, only a portion of the entire system capability is used for detecting the web edge during normal operation. Due to the autonomous nature of each transmit segment 23 in combination with the respective receive segment 25 (see FIG. 6), the logical sensor size for web edge guiding can be specified with respect to the associated receive segment 25 in terms of pixel resolution capability of the photodiodes 128.

Figure 9:
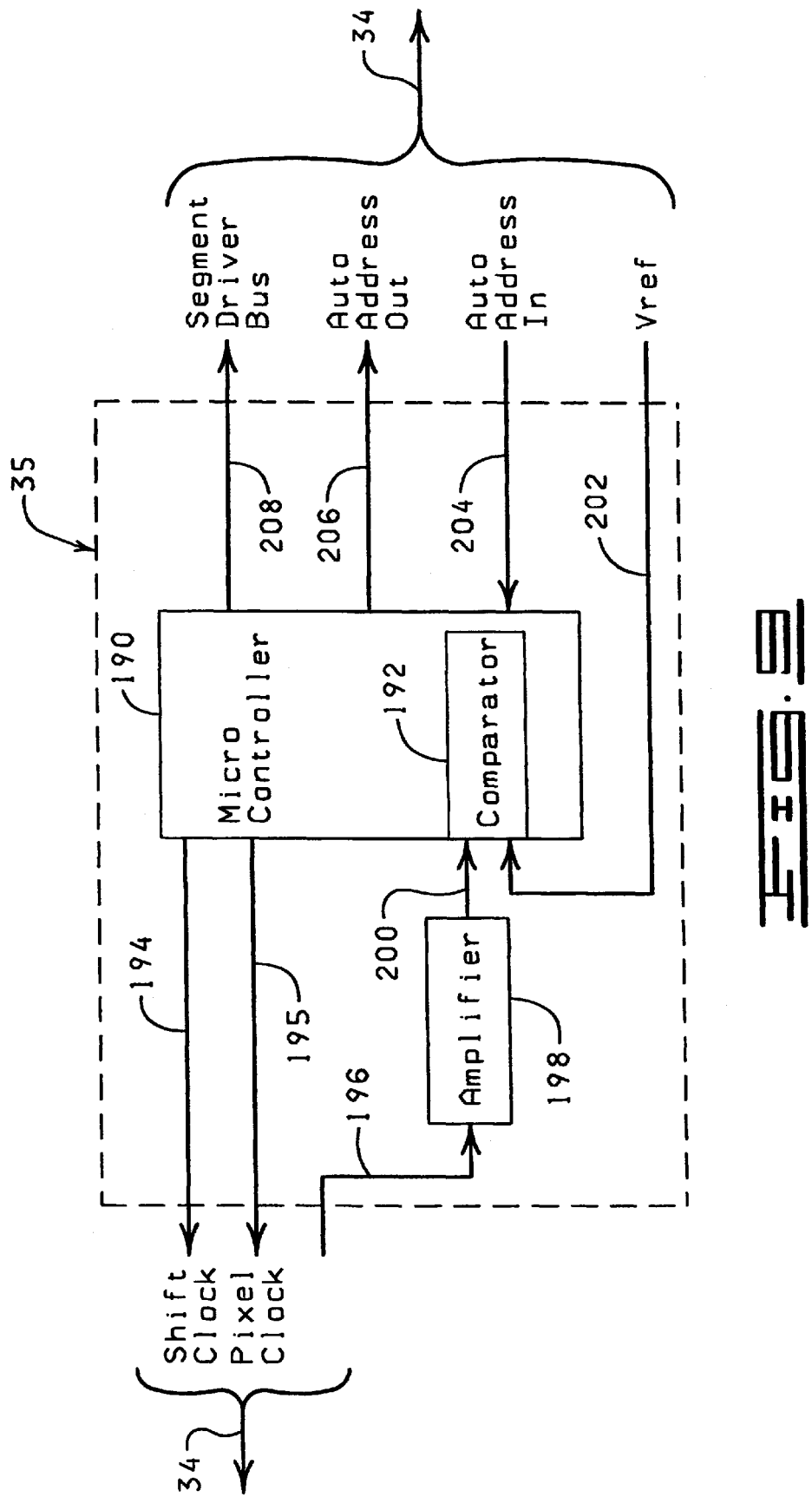
FIG. 9 is a schematic view of one embodiment of the receive segment driver of the receiver assembly.

Referring to FIG. 9, in one embodiment, each of the receive segment drivers 35 of the receiver assembly 24 may contain a microcontroller 190 for use by the receive segment driver 35. The microcontroller 190 includes a comparator 192. The microcontroller 190 generates signals for transmission to the respective receive segment 25 via signal paths 194 and 195. Such generated signals are indicative of a shift clock signal 194 and a pixel clock signal 195 which are identified separately in FIG. 9 for purposes of clarity. Such signals are generated by the microcontroller 190 in response to the issuance of a scan signal from the main microcontroller 30. Such scan signals are transmitted via the signal path 34.

The pixel clock (not shown) is employed to retrieve data from each individual pixel, such as the photodiodes 128, of the receive segment 25. The pixel clock signal 195 is generated by the microcontroller 190 and transmitted via the signal path 195. The shift clock transfers signals indicative of video data of all of the pixels, such as the photodiodes 128, to the analog output of the receive segment 25, such signals being known as video output. The video output signals transmitted by the receive segment 25 are received by the receive segment driver 35 via a signal path 196. Such video output signals may be amplified by an amplifier 198 before being transmitted onto a signal path 200 to the comparator 192 input of the microcontroller 190.

The receive segment driver 35 communicates with the main controller 30 along the receiver signal path 34 which is shown in FIG. 9 as a reference signal path 202, an auto-address in signal path 204, an auto-address out signal path 206, and a driver bus signal path 208. The driver bus signal path 208 is capable of communicating with other receive segment drivers 35. Each pixel of the video signal is compared to a common video reference input which may be supplied by the main controller 30 and received along the reference signal path 202 or a local reference input at the receive segment driver 35. The presence of the edge 12 of the web material 14 causes a transition in the video signal from its previous state at the pixel where the web edge 12 is found. Based on this transition, the microcontroller 190 records a value indicative of the web edge 12 location based upon the pixel location of the photodiodes 128 generating photoactivated or non-photoactivated signal responses. In one embodiment, a plurality of receive segment drivers 35 participate in a full-duplex network such that the receive segment drivers 35 are capable of transmitting signals onto the receiver signal path 34 while simultaneously receiving signals via the same transmitted by the main controller 30.

Referring now to FIG. 10, in one embodiment of the present invention the main controller 30 includes a segment controller 220, a communication controller 222, a DAC converter 224, a first E/I converter 226, a second E/I converter 228, and a third E/I converter 229. The communication controller 222 receives signals along a signal path 230 from devices attached to the main controller 30 such as personal computers, control panels, or other devices. Such attached devices communicate diagnostic and configuration signals to communication controller 222, for example.

The communication controller 222 transmits signals indicative of the diagnostic, configuration and web edge 12 information to devices attached thereto. In one embodiment the signal path 230 may be provided with a RS-485 or other suitable converter for such purposes. The communication controller 222 communicates the diagnostic and other signals to the segment controller 220 via a signal path 232, the signal path 232 may be a SPI link for such communication. In one embodiment, the segment controller 220 provides command interpreter, status generation and the main diagnostic kernel (not shown) and is the slave portion of the SPI link with the communication controller 222.

The segment controller 220 communicates light transmit signals to the transmitter assembly 22 via the signal path 234. In the embodiment shown in FIG. 10, the light transmit signals transmitted via the signal path 234 include a clock signal 234*a* and a data signals 234*b* shown as being carried along two separate signal paths 234*a* and 234*b* of the signal path 234 for clarity. The light transmit signals transmitted along the signal path 234 are indicative of the actuation and deactuation of the transmit segments 23 of the transmitter assembly 22.

The segment controller 220 calibrates the overlapping photodiodes 128 of the receive segments 23, such as the photodiodes 164*b* of the receive segment 25*b* (FIG. 8) previously described. The segment controller 220 communicates with the receive segment drivers 35 via a signal path 238. In the embodiment shown in FIG. 10, the signal path 238 includes a RS-485 converter, and may include a plurality of signal paths 240, 242, and 244 which are shown as being carried along four separate signal paths 240, 242, 244 of the signal path 238 for clarity. The segment controller 220 is capable of transmitting signals via the signal path 238 which is received by the receive segment driver 35, such signal initiating synchronous array scanning of the all attached receive segments 25. The segment controller 220 then receives signals from the receive segment 25 which indicates the location of the position of the edge 12 of the web material 14 and transmits a digital signal to the DAC converter 224 along the signal path 246. That is the segment controller 220 calculates the actual edge 12 position by correcting for the overlaps previously discussed, such as the photodiodes 164b of the receive segment 25b (FIG. 8). Thereafter, the segment controller 220 assigns and positions the relocatable proportional bands, which is the equivalent of the logical edge sensor position, for each edge 12 of the web material 14.

The DAC converter 224 transmits signals indicative of the video reference, previously discussed, to the receive segment driver 35 via a signal path 244. The DAC converter 224 transmits a signal, which is indicative of the location of the first edge 12 of the web material 14, to the first E/I converter 226 via a signal path 248. The DAC converter 224 transmits a signal, which is indicative of the location of another edge 12 of the web material 14, to the second E/I converter 228 via a signal path 250. Similarly, the DAC converter 224 transmits a signal, which is indicative of the width of the web material, to the third E/I converter 229 via a signal path 249. That is, the DAC converter 224 converts the digital signal received along the signal path 246 into analog signals. The DAC converter 224 then transmits the analog signals onto signal paths 248, 249, and 250 which are indicative of web width and the location of the edges 12 of the web of material 14.

The first E/I converter 226 outputs an enhanced sensor output signal indicative of the location of the first edge 12 via a signal path 252 so that such sensor output signal can be received by a conventional web guiding signal processor (not shown) via the output signal path 38. The second E/I converter 228 outputs an enhanced sensor output signal indicative of another edge 12 via a signal path 254 so that such sensor output signal can be received by a conventional web guiding signal processor (not shown) via the output signal path 38. The third E/I converter 228 outputs an enhanced sensor output signal indicative of the web width via a signal path 256 so that such sensor output signal can be received by a conventional web guiding signal processor (not shown) via the output signal path 38. That is, the E/I converters 226, 228, and 229 convert the analog signals received from the DAC converter 224 and output current signals via the respective signal paths 250, 254, and 256. These sensor output signals can be voltage-to-current converted signals having a range of between 0–10 milliamperes.

Additionally, the segment controller 220 is responsible for the addressing process. Each receive segment driver 35 requires a unique address to permit usage of a common bus, such as the driver bus path 208; therefore, each receive segment driver 35 must be address configurable. This is typically accomplished with jumpers, dip switches, or downloadable non-volatile memory parameters. For example, auto-addressing of the receive segment drivers 35 of the receiver assembly 24 can be accomplished by attaching a personal computer (not shown) to the main controller 30. The auto-addressing of the receive segment driver 35 of the receiver assembly 22 does not require jumpers which makes every receive segment driver 35 substantially identical and easy to manufacture and maintain.

Each receive segment driver 35 receives a unique address from the segment controller 220 via the receiver signal path 34 during the initial setup of the light sensor system 10. The address is stored by the receive segment driver 35 in non-volatile memory. The auto-addressing is accomplished by the first step of the segment controller 220 transmitting a signal indicative of reset of the receive segment drivers 35 via the reset signal path 240 of the receiver signal path 34. In response to receiving such a signal, the receive segment drivers 35, clear the auto-address out path 206 (FIG. 9).

The segment controller 220 sets the auto-address signal path 242 high. The segment controller 220 then transmits a signal via the receiver signal path 34 to the receive segment drivers 35 indicative of initiating auto-addressing. In response thereto, each receive segment. driver 35 sets an address of zero in non-volatile memory. The segment controller 220 then polls for address zero. The receive segment driver 35 will respond where that receive segment driver 35 has an auto-address line 204 set to high and an address of zero. The segment controller 220 transmits a signal back to the receive segment driver 35 indicative of the desired address for the responding receive segment driver 35 via the auto-address in path 204. In one embodiment, addresses are assigned by the segment controller 220 and the address are sequential from 1-30.

The receive segment driver 35 receiving the address stores such address and verifies the address of the receive segment driver 35 in non-volatile memory. The receive segment driver 35 then transmits a signal indicative of acknowledgment of the address being successfully stored and verified to the segment controller 220. The receiving segment driver 35 then sets the auto-address out path 206 high. The segment controller 220 transmits a signal indicative of successful addressing of the first receive segment driver 35 to the communication controller 222 which communicates same to such attached devices, such as a personal computer (not shown).

The segment controller 220 then repeats the steps of polling and addressing each of the receive segment drivers 35 until all receive segment drivers 35 of the receiver assembly 22 have been addressed successfully. The segment controller then records the total number of receive segment drivers 35 of the receiver assembly 22.

Where the web material 14 is substantially transparent, an image sensor, such as the receive segment 25, with a fine resolution and a substantially homogeneous pixel resolution, such as a charged coupled device (CCD), may be substituted for the linear sensor array 120. In such construction, detecting the edge 12 of transparent web material 14 may be accomplished by normalization of all pixels or differentiation along the video signal. The normalized or differentiated signal is compared to a set threshold. In either case, the variation in pixel signals must be amplified to determine the first major transition which is indicative of the edge 12 of the web material 14. Additionally, for transparent web material 14, it may be beneficial to scan the receive segments 25 from the outside, progressively inward, to determine the first major transition, which is indicative of the location of the respective edges 12 of the web material 14. This method eliminates errors associated with transparent material of intermittent opacity or having opaque printing thereon.

From the above description it is clear that the present invention is well adapted to carry out the objects and to attain the advantages mentioned herein as well as those inherent in the invention. While one embodiment of the invention has been described for purposes of this disclosure, it will be understood that numerous changes may be made which will readily suggest themselves to those skilled in the art and which are accomplished within the spirit of the invention disclosed and defined in the appended claims.

What is claimed is:

1. A method for guiding a continuous web of material traveling along a predetermined travel path, comprising:

providing a transmitter assembly disposed substantially adjacent the travel path so that a collimated light curtain can be transmitted across at least a portion of the travel path;

providing a receiver assembly generating output signals in response to receiving at least a portion of the collimated light curtain transmitted by the transmitter assembly, the receiver assembly spaced a distance from the transmitter assembly whereby the travel path passes in between the transmitter assembly and the receiver assembly and at least a portion of the continuous web of material traveling along the travel path blocks at least a portion of the collimated light curtain from reception by the receiver assembly such that the output signal generated by the receiver assembly indicates the position of the continuous web of material as same is moved along the travel path in between the transmitter assembly and the receiver assembly;

activating the transmitter assembly so as to provide at least one collimated light curtain across the travel path;

activating the receiver assembly;

generating a logical sensor array extending across the receiver assembly;

passing the continuous web of material in between the transmitter assembly and the receiver assembly along the predetermined travel path such that the continuous web of material blocks at least a portion of the collimated light curtain from reception by the receiver assembly thereby indicating the position of the continuous web of material therebetween; and generating, by the receiver assembly, output signals indicative of the position of at least one edge of the continuous web of material based on the logical sensor array; and controlling the lateral position of the continuous web of material to maintain the continuous web of material traveling along the predetermined travel path based on the signals output by the receiver assembly.

2. The method of claim 1, wherein in the step of providing a transmitter assembly, the transmitter assembly is provided with a plurality of transmit segments with each transmit segment outputting a portion of the collimated light curtain and increasing the width of the transmitter assembly, each transmit segment having a first end and a second end, the transmit segments positioned in a staggered formation so that the first end of one transmit segment in a pair of adjacently disposed transmit segments extends past a second end of another transmit segment in the pair of adjacently disposed transmit segments to form an overlap area between the pair of adjacently disposed transmit segments to prevent formation of a gap in the collimated light curtain, and wherein in the step of providing a receiver assembly, the receiver assembly is provided with a plurality of receive segments with each receive segment increasing the width of the receiver assembly and having a first end and a second end, each of the receive segments receiving the portion of the collimated light curtain produced by one of the transmit segments, the receive segments being staggered so that the first end of one receive segment in a pair of adjacently disposed receive segments extends past a second end of another receive segment in the pair of adjacently disposed receive segments to form an overlap area between the pair of adjacently disposed receive segments, each of the receive segments being formed of a plurality of pixels with some of the pixels in each receive segment being disposed in one of the overlap areas, and wherein the method step of generating the logical sensor array comprises the steps of:

outputting a portion of the light curtain by each of the transmit segments while the continuous web of material is not interposed between the transmitter assembly and the receiver assembly;

receiving the portions of the light curtain generated by the transmit segments by the receive segments with each receive segment receiving the portion of the light curtain output by the transmit segment corresponding to the receive segment; and ignoring pixels of one of the adjacently disposed receive segments in each overlap area so as to form a logical sensor array extending continuously across the receiver assembly.

3. The method of claim 1, wherein in the step of providing a transmitter assembly, the transmitter assembly is provided with a plurality of transmit segments with each transmit segment outputting a portion of the collimated light curtain and increasing the width of the transmitter assembly, each transmit segment having a first end and a second end and being positioned in a staggered formation so that the first end of one transmit segment in a pair of adjacently disposed transmit segments extends past a second end of another transmit segment in the pair of adjacently disposed transmit segments to form an overlap area between the pair of adjacently disposed transmit segments to prevent formation of a gap in the collimated light curtain, and wherein in the step of providing a receiver assembly, the receiver assembly is provided with a plurality of receive segments with each receive segment increasing the width of the receiver assembly and having a first end and a second end, each of the receive segments receiving the portion of the collimated light curtain produced by one of the transmit segments, the receive segments being staggered so that the first end of one receive segment in a pair of adjacently disposed receive segments extends past a second end of another receive segment in the pair of adjacently disposed receive segments to form an overlap area between the pair of adjacently disposed receive segments, each of the receive segments being formed of a plurality of pixels with some of the pixels in each receive segment being disposed in one of the overlap areas, and wherein the method further comprises the steps of:

actuating and deactuating transmit segments so that the actuated transmit segments generally follow the edge of the web material.

4. A sensor system for guiding a continuous web of material along a predetermined travel path, the sensor system comprising:

a transmitter assembly comprising:

a plurality of transmit segments, each transmit segment outputting a portion of a collimated light curtain across the travel path and increasing the width of the transmitter assembly, each transmit segment having a first end and a second end, at least a pair of adjacently disposed transmit segments being positioned in a staggered formation so that the first end of one transmit segment in the pair of adjacently disposed transmit segments extends past a second end of another transmit segment in the pair of adjacently disposed transmit segments to form an overlap area between the pair of adjacently disposed transmit segments to prevent formation of a gap in the collimated light curtain;

a receiver assembly generating output signals in response to receiving at least a portion of the collimated light curtain transmitted by the transmitter assembly, the receiver assembly spaced a distance from the transmitter assembly whereby the travel path passes in between the transmitter assembly and the receiver assembly, the receiver assembly comprising:

a plurality of receive segments with each receive segment increasing the width of the receiver assembly and having a first end and a second end, each of the receive segments receiving the portion of the collimated light curtain produced by one of the transmit segments, at least a pair of adjacently disposed receive segments being staggered so that the first end of one receive segment in the pair of adjacently disposed receive segments extends past a second end of another receive segment in the pair of adjacently disposed receive segments to form an overlap area between the pair of adjacently disposed receive segments, each of the receive segments being formed of a plurality of pixels with some of the pixels in each receive segment being disposed in one of the overlap areas;

a filter positioned adjacent to the receive segments so as to pass the collimated light curtain while preventing the passage of other light therethrough so as to provide ambient light immunity for the receiver assembly;

a controller establishing communication with the transmit segments to independently control each of the transmit segments, the controller receiving signals from the receiver assembly indicative of the location of at least one edge of the continuous web of material and being programmed to ignore pixels of one of the adjacently disposed receive segments in each overlap area so as to form a logical sensor array extending across at least a portion of the receiver assembly.

5. The sensor system of claim 4, wherein each transmit segment includes:

a light source, the light source outputting a laser light beam having an elliptical shape, the laser light beam having a minor axis and a major axis;

an upper optical lens spaced a distance from the light source, the upper optical lens receiving the light beam from the light source, the upper optical lens being shaped to output a laser light beam which is collimated along the minor axis thereof whereby the laser light beam exiting the upper optical lens continues to diverge outwardly along the major axis thereof; and a lower optical lens spaced a distance from the upper optical lens, the lower optical lens receiving the laser light beam output by the upper optical lens, the lower optical lens shaped to collimize the laser light beam along the major axis thereof such that the lower optical lens produces a substantially continuous, rectangular shaped collimated light curtain.

6. The sensor system of claim 4, wherein the staggered formation of the transmit segments has a width exceeding the width of the continuous web of material, and the staggered formation of the receive segments has a width exceeding the width of the continuous web of material.

7. The sensor system of claim 4, wherein the filter is a red light filter including an integral horizontal light control film.

8. A sensor system for guiding a continuous web of material along a predetermined travel path, the sensor system comprising:

a transmitter assembly comprising:

a plurality of transmit segments, each transmit segment outputting a portion of a collimated light curtain across the travel path and increasing the width of the transmitter assembly, each transmit segment having a first end and a second end, at least a pair of adjacently disposed transmit segments being positioned in a staggered formation so that the first end of one transmit segment in the pair of adjacently disposed transmit segments extends past a second end of another transmit segment in the pair of adjacently disposed transmit segments to form an overlap area between the pair of adjacently disposed transmit segments to prevent formation of a gap in the collimated light curtain;

a receiver assembly generating output signals in response to receiving at least a portion of the collimated light curtain transmitted by the transmitter assembly, the receiver assembly spaced a distance from the transmitter assembly whereby the travel path passes in between the transmitter assembly and the receiver assembly, the receiver assembly comprising:

a plurality of receive segments with each receive segment increasing the width of the receiver assembly and having a first end and a second end, each of the receive segments receiving the portion of the collimated light curtain produced by one of the transmit segments, at least a pair of adjacently disposed receive segments being staggered so that the first end of one receive segment in the pair of adjacently disposed receive segments extends past a second end of another receive segment in the pair of adjacently disposed receive segments to form an overlap area between the pair of adjacently disposed receive segments, each of the receive segments being formed of a plurality of pixels with some of the pixels in each receive segment being disposed in one of the overlap areas;

a filter positioned adjacent to the receive segments so as to pass the collimated light curtain while preventing the passage of other light therethrough so as to provide ambient light immunity for the receiver assembly;

a controller establishing communication with the transmit segments to independently control each of the transmit segments, the controller receiving signals from the receiver assembly indicative of the location of at least one edge of the continuous web of material and selectively actuating and deactuating predetermined transmit segments as the continuous web of material moves laterally relative to the predetermined travel path so that the actuated transmit segments generally follow at least one edge of the continuous web of material.

9. The sensor system of claim 8, wherein the controller is programmed to ignore pixels of one of the adjacently disposed receive segments in each overlap area so as to form a logical sensor array extending continuously across the receiver assembly.

10. The sensor system of claim 8, wherein each transmit segment includes:

a light source, the light source outputting a laser light beam having an elliptical shape, the laser light beam having a minor axis and a major axis;

an upper optical lens spaced a distance from the light source, the upper optical lens receiving the light beam from the light source, the upper optical lens being shaped to output a laser light beam which is collimated along the minor axis thereof whereby the laser light beam exiting the upper optical lens continues to diverge outwardly along the major axis thereof; and a lower optical lens spaced a distance from the upper optical lens, the lower optical lens receiving the laser light beam output by the upper optical lens, the lower optical lens shaped to collimize the laser light beam along the major axis thereof such that the lower optical lens produces a substantially continuous, rectangular shaped collimated light curtain.

11. The sensor system of claim 8, wherein the staggered formation of the transmit segments has a width exceeding the width of the continuous web of material, and the staggered formation of the receive segments has a width exceeding the width of the continuous web of material.

12. The sensor system of claim 11, wherein the filter is a red light filter including an integral horizontal light control film.

13. A sensor system for guiding a continuous web of material along a predetermined travel path, the system comprising:

a transmitter assembly having a width exceeding the width of the continuous web of material, the transmitter assembly comprising:

a plurality of transmit segments, each transmit segment outputting a rectangularly shaped collimated light curtain across the travel path and increasing the width of the transmitter assembly, each transmit segment having a first end and a second end, at least a pair of adjacently disposed transmit segments being positioned in a staggered formation so that the first end of one transmit segment in the pair of adjacently disposed transmit segments extends past a second end of another transmit segment in the pair of adjacently disposed transmit segments to form an overlap area between the pair of adjacently disposed transmit segments to prevent formation of a gap in the collimated light curtain;

a receiver assembly generating output signals in response to receiving at least a portion of the collimated light curtain transmitted by the transmit segments of the transmitter assembly, the receiver assembly spaced a distance from the transmitter assembly whereby the travel path passes in between the transmitter assembly and the receiver assembly, the receiver assembly having a combined width exceeding the width of the continuous web of material, the receiver assembly comprising:

a plurality of receive segments with each receive segment increasing the width of the receiver assembly and having a first end and a second end, each of the receive segments receiving the portion of the collimated light curtain produced by one of the transmit segments, at least a pair of adjacently disposed transmit segments being staggered so that the first end of one receive segment in the pair of adjacently disposed receive segments extends past a second end of another receive segment in the pair of adjacently disposed receive segments to form an overlap area between the pair of adjacently disposed receive segments, each of the receive segments being formed of a plurality of pixels with some of the pixels in each receive segment being disposed in one of the overlap areas, the receive segments;

a filter positioned adjacent to the receive segments so as to pass the collimated light curtain while preventing the passage of other light therethrough so as to provide ambient light immunity for the receiver assembly;

a pivotal platform disposed in the travel path of the continuous web of material, the pivotal platform controlling the lateral position of the continuous web of material based on the signals produced by the receiver assembly to maintain the continuous web of material traveling along the predetermined travel path; and a controller establishing communication with the transmit segments to independently control each of the transmit segments, the controller receiving signals from the receiver assembly indicative of the location of at least one edge of the continuous web of material and selectively actuating and deactuating predetermined transmit segments as the continuous web of material moves laterally relative to the predetermined travel path so that the actuated transmit segments generally follow at least one edge of the continuous web of material.

* * * * *

UNITED STATES PATENT AND TRADEMARK OFFICE
CERTIFICATE OF CORRECTION

PATENT NO.        : 6,323,948 B2  Page 1 of 1
APPLICATION NO. : 09/756967
DATED             : November 27, 2001
INVENTOR(S)       : Haque et al.

It is certified that error appears in the above-identified patent and that said Letters Patent is hereby corrected as shown below:

Column 11, line 44: After the word "sensor" delete the word "ay" and replace with --array--.

Signed and Sealed this

Fifteenth Day of August, 2006

JON W. DUDAS
*Director of the United States Patent and Trademark Office*